(12) United States Patent
Markiewicz

(10) Patent No.: US 11,681,740 B2
(45) Date of Patent: Jun. 20, 2023

(54) PROBABILISTIC INDICES FOR ACCESSING AUTHORING STREAMS

(71) Applicant: Microsoft Technology Licensing, LLC, Redmond, WA (US)

(72) Inventor: Marcus Eduardo Markiewicz, Teaneck, NJ (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 9 days.

(21) Appl. No.: 17/219,002

(22) Filed: Mar. 31, 2021

(65) Prior Publication Data

US 2022/0318294 A1    Oct. 6, 2022

(51) Int. Cl.
*G06F 16/45* (2019.01)
*G06F 16/41* (2019.01)
*G06F 21/10* (2013.01)
*H04L 67/06* (2022.01)
*G06F 18/2415* (2023.01)

(52) U.S. Cl.
CPC .............. *G06F 16/45* (2019.01); *G06F 16/41* (2019.01); *G06F 18/2415* (2023.01); *G06F 21/10* (2013.01); *H04L 67/06* (2013.01)

(58) Field of Classification Search
CPC ................................. G06F 16/45; G06F 16/41
USPC ........................................................ 707/741
See application file for complete search history.

(56) References Cited

U.S. PATENT DOCUMENTS

| | | | |
|---|---|---|---|
| 2004/0143603 A1 | 7/2004 | Kaufmann et al. | |
| 2012/0030477 A1* | 2/2012 | Lu | G06F 11/1458 707/769 |
| 2012/0303597 A1 | 11/2012 | Bird et al. | |
| 2018/0004769 A1* | 1/2018 | Markiewicz | G06F 3/0685 |
| 2019/0147402 A1 | 5/2019 | Sitrick et al. | |
| 2022/0043585 A1* | 2/2022 | Senyuk | G06F 3/0647 |

OTHER PUBLICATIONS

"Cuckoo Filter", Retrieved From: https://en.wikipedia.org/w/index.php?title=Cuckoo_filter&oldid=996675419, Dec. 28, 2020, 2 Pages.
Bin Fan, et al.; "Cuckoo Filter: Practically Better Than Bloom"; Dec. 2014; 13 pages; CoNEXT' 14; Sydney, Australia.
"Binary Data Format for File Synchronization via SOAP"; Jun. 30, 2015; pp. 1-48; MS-FSSHTTPD; Microsoft Corporation; U.S.A.
"International Search Report and Written Opinion Issued in PCT Application No. PCT/US22/020464", dated Jun. 3, 2022, 12 Pages.

* cited by examiner

*Primary Examiner* — Kimberly L Wilson

(57) ABSTRACT

In various implementations, streams are sent and received by a computing device engaged in an authoring session with respect to an electronic document. The computing device stores the streams in multiple container files associated with an instance of the electronic document open on the computing device. The device maintains an indices file to reflect a presence of the streams in the container files, such that fast access can be provided to the streams at a later time. The indices file comprises multiple probabilistic data structures corresponding to the container files that each indicate on a probabilistic basis whether a given stream is present in a corresponding one of the container files. The computing device uses the indices file to retrieve the streams from the container files.

20 Claims, 10 Drawing Sheets

(READ SCENARIO)

FIGURE 6 (ALT. WRITE SCENARIO)

PROBABILISTIC INDICES FOR ACCESSING AUTHORING STREAMS

TECHNICAL FIELD

Aspects of the disclosure are related to the field of software applications and services and, more particularly, to technology for storing and accessing authoring streams.

BACKGROUND

Many software applications and services utilize document protocols that store the content of a file as a stream. While numerous variations exist, the basic concept is to capture user edits as they occur and persist those edits as authoring streams in one or more sub-files of a document. The streams include meta data that describes the actions such that the actions can be played out in a user interface. Some protocols also include the content itself in the streams, although the content can be stored separately from the stream meta data.

The granularity of a given stream can vary based on its implementation. In some situations, the streams capture or otherwise refers to one or more editing actions within very small timeframes, making them more granular. The larger the timeframe, the less granular the streams. In any case, any given document can give rise to a large number of streams that need to be maintained and tracked to facilitate fast access to them. This is especially the case with respect to co-authoring environments.

Co-authoring is a feature of many software applications and services that allows multiple users to work together on word processing documents, spreadsheets, presentations, notebooks, and the like, all of which are referred to herein as electronic documents (or just documents). In many implementations, each user can view and edit a given document locally at the same time as other users edit their instances of the same document, and every user can see in near real-time the changes being made to the document by the others. Some secondary features include the ability to roll-back changes and to filter the changes made by specific people.

Whether provided in the context of a native application, a browser-based application, or a mobile application, co-authoring requires a great deal of coordination and communication between and amongst the multiple applications through which users experience a shared document. In one model, the applications keep their respective instances of a document up to date by sending and receiving streams that describe or otherwise indicate the events occurring in their documents. The streams are stored locally by the applications so that they can be accessed quickly when needed.

As an example, one user in a co-authoring session provided by an application may edit a shared document causing the application to send a stream indicating the edit. The other applications engaged in the co-authoring session receive the stream and persist it to their local storage, while recording its location in an index. Any one of the applications may need subsequent access to the stream, at which time the application opens the index and searches the index for the file in which it was stored. Next, the application opens the identified file, searches for the stream, and finally reads it out such that the edit indicated in the stream may be implemented locally. In the aggregate, the steps involved in accessing such streams have the potential to slow the user experience and consume too much power.

OVERVIEW

Technology is disclosed herein for managing streams in document authoring environments. In various implementations, streams are sent and received by a computing device engaged in an authoring session with respect to an electronic document. The computing device stores the streams in multiple container files associated with an instance of the electronic document open on the computing device. The device maintains an indices file to reflect a presence of the streams in the container files, such that fast access can be provided to the streams at a later time. The indices file comprises multiple probabilistic data structures corresponding to the container files that each indicate on a probabilistic basis whether a given stream is present in a corresponding one of the container files. The computing device uses the indices file to retrieve the streams from the container files.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Technology is disclosed herein for enhancing the management of authoring streams associated with electronic documents. Authoring sessions produce large volumes of binary streams that are generally immutable and have independent life cycles relative to other components of a document. This is especially the case with respect to co-authoring sessions, for which the streams include data that represent the behavior, actions, or other such events in a document that is shared between or amongst multiple users. The streams must be persisted to enable the user's instance of the document to remain up to date, but also to enable other features such as change tracking, change attribution, and rollbacks.

The stream management technology disclosed herein proposes to persist the streams in multiple container files that correspond to multiple probabilistic data structures. The data structures are adjusted to reflect the presence of the streams in their corresponding container files. The probabilistic data structures provide a fast and efficient way to determine whether a requested stream is present in a corresponding container files. Examples of the probabilistic data structures include filters such as Bloom filters and Cuckoo filters.

At runtime, an indices file that holds all of the data structures is loaded into memory when a subject document is open. A stream manager receives access requests related to reading and writing streams to and from the container files. When performing reads, the stream manager queries the probabilistic data structures on an iterative basis to identify the container file that holds the actual stream. The data structures are capable of providing false positives, but never false negatives. When streams need to be added, the stream manager identifies the target container file and opens it into memory. The stream is then written to the container file and the probabilistic data structure corresponding to the file is updated to reflect the presence of the stream in the file. In this manner, subsequent read requests for the same stream are likely to be directed to the appropriate container file.

FIGS. 1-10 illustrates various implementations of the stream management technology proposed herein. While the Figures emphasize co-authoring environments and implementations, it may be appreciated that the concepts apply as well to single-author environments and implementations.

Figure 1:
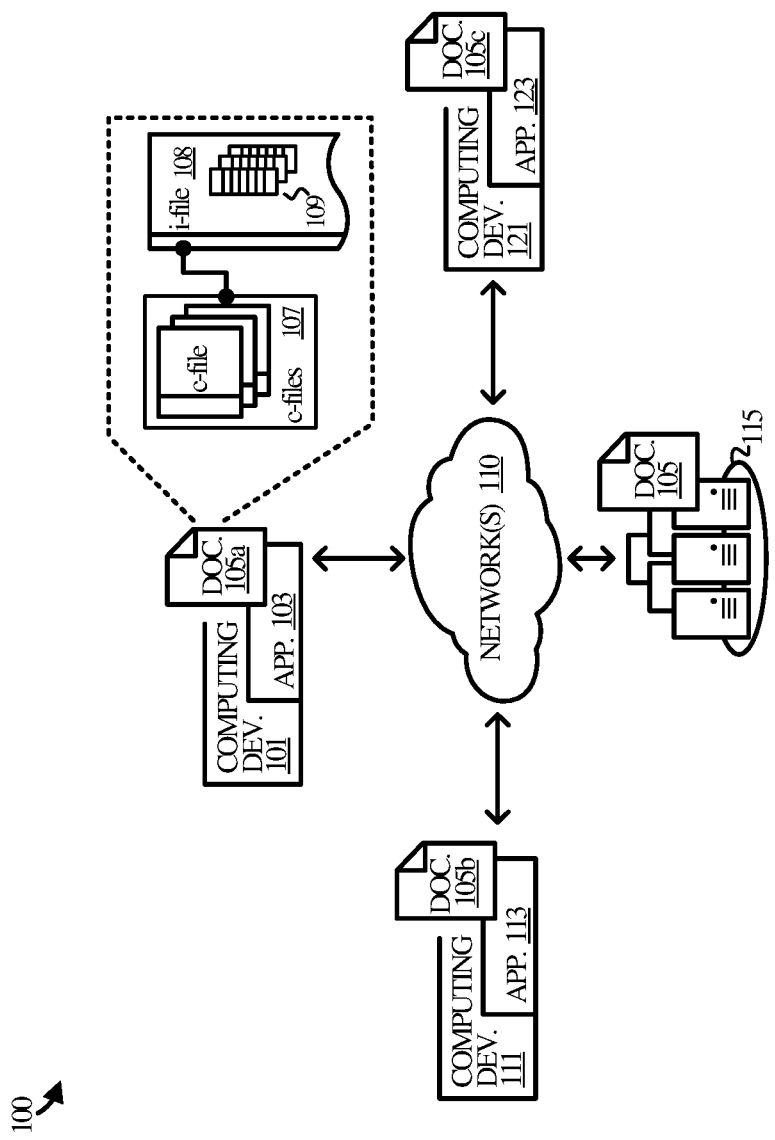
FIG. 1 illustrates a co-authoring environment in an implementation.
Figure 10:
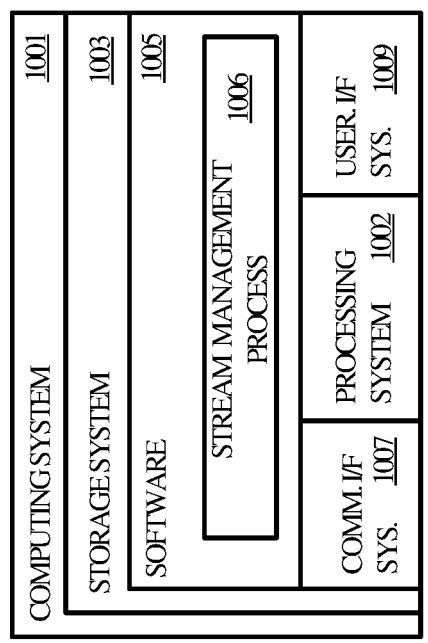
FIG. 10 illustrates a computing system suitable for implementing the various operational environments, architectures, processes, scenarios, and sequences discussed below with respect to the Figures.

FIG. 1 illustrates a co-authoring environment 100 in an implementation. Co-authoring environment 100 includes computing device 101, computing device 111, and computing device 121. Computing devices 101, 111, and 121 host applications 103, 113, and 123 respectively, and communicate with each other over one or more networks, represented by network 110. Examples of computing devices 101, 111, and 121 include personal computers, tablet computers, mobile phones, and any other suitable devices, of which computing device 1001 in FIG. 10 is broadly representative. Examples of network 110 include internets and intranets, the Internet, wired and wireless networks, local area networks (LANs) and wide area networks (WANs), and any other network or combination thereof.

Applications 103, 113, and 123 are each representative of applications capable of engaging in a co-authoring session with respect to an electronic document 105 such as a word processing document, spreadsheet, presentation, notebook, or the like, all of which are referred to herein as documents. Applications 103, 113, and 123 may each be a native application, a browser-based application, a mobile application, or any other application suitable for co-authoring in electronic documents. Examples of applications 103, 113, and 123 include but are not limited to word processors, spreadsheet applications, presentation applications, and notebook applications.

Documents 105a, 105b, and 105c are each local instances of an electronic document that is the subject of the co-authoring session between applications 103, 113, and 123, represented by document 105. The documents comprise data arranged in accordance with a file format that supports co-authoring such as the .docx format for word processing, the .pptx format, and the .xlsx format for spreadsheets, as well as any suitable variations or equivalents thereof whether they be open or proprietary formats. Document 105 resides in data center 115 which may host one or more services that support the co-authoring session.

In a highly simplified view (which applies as well to documents 105b and 105c), document 105a includes container files 107 and an indices file 108. Container files 107 provide a repository for co-authoring streams generated internally by application 103 and externally by applications 113 and 123. The content of the streams (such as user generated text, images, and the like) may be stored in container files 107, separately from container files 107 (e.g., in separate files), or in a combined manner with some of the content being stored in container files 107, while other content items being stored elsewhere. Indices file 108 includes probabilistic data structures 109 that provide indices into container files 107.

Probabilistic data structures 109 hold encoded indications of the streams (but not the streams themselves) in a manner indicative of where in the container files 107 the streams may be located. Examples of probabilistic data structures 109 include, but are not limited to, Bloom filters, Counting Bloom filters, Quotient filters, Cuckoo filters, and any other probabilistic data structure suitable for membership querying. The encoded indications of the streams are smaller than the streams themselves and, in some implementations, are smaller than even the stream identifiers associated with each stream. In the case of a filter such as those mentioned above, the encoded indications are entries into one or more indexes of the filter. The compact nature of the encoded indications allows indices file 108 to be considerably smaller than if the full stream identifiers were stored in it. Indices file 108 may thus be capable of being loaded in its entirety into memory at run-time when a document is open.

The probabilistic aspect of the data structures in indices file 108 means that the data structures are likely to return the correct location for a requested stream but not without some uncertainty. This is an inherent characteristic of probabilistic data structures that represents a tradeoff between size and accuracy. In general, the larger a probabilistic data structure is, the more accurate it will be, but the more storage space and memory it will require. A smaller probabilistic data structure will therefore require less space but will be less accurate.

Figure 2:
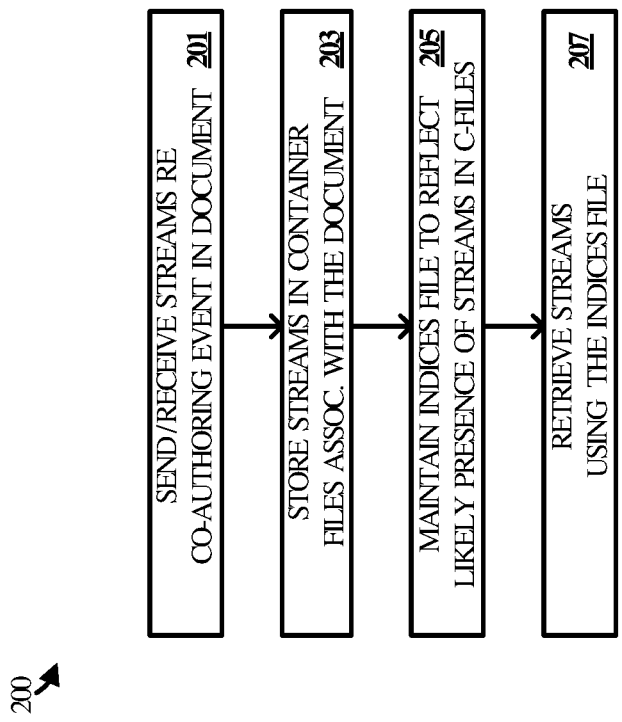
FIG. 2 illustrates a stream management process in an implementation.

FIG. 2 illustrates a stream management process 200 employed by a computing device to manage the storage, indexing, and retrieval of streams in a co-authoring environment. Stream management process 200 may be implemented in program instructions in the context of any of the software applications, modules, components, or other such programming elements of a computing device such as application 103 on computing device 101. The program instructions direct its underlying physical or virtual computing system or systems to operate as follows, referring parenthetically to the steps in FIG. 2 in the context of co-authoring environment 100 for exemplary purposes.

In operation, computing device 101 under the direction of application 103 sends and receives streams related to co-authoring events in a shared document (step 201). Document 105a is a local instance of the shared document and the co-authoring events may be caused by local user input with respect to document 105a and/or by other events occurring with respect to document 105b and document 105c. Computing device 101 opens indices file 108 when document 105a is opened and keeps the entirety of indices file 108 open in memory while document 105a is open, which provides fast access to indices file 108 by application 103.

As the co-authoring streams are sent and received, computing device 101 stores the streams in container files 107 (step 203). Computing device 101 fills the container files one at a time until they are full, before creating and filling the next one. The size of each container file is such that it can be read in a single I/O operation (e.g., 1 MB). The container files are opened only when there is a need to read or write a specific stream. In some implementations, read requests are bundled per container file so as to minimize I/O operations. Container files may also be kept in memory cache to reduce I/O to persistent storage (e.g., disk or solid-state storage). The streams as stored in the container files include their stream identifiers (IDs) as well as information about an associated co-authoring event.

Computing device 101 also maintains indices file 108 to reflect a probable location of the streams in container files 107 (step 205). Maintaining indices file 108 allows application 103 to read and write the streams to and from container files 107 quickly and with reduced I/O. Indices file 108 is maintained by adding (and sometimes removing) encoded versions of the stream IDs from probabilistic data structures 109 as the streams are written to (and sometimes deleted from) the container files.

Computing device 101 uses indices file 108 to retrieve the streams (step 207) by querying the probabilistic data structures to determine whether any of them identify a requested stream as present. An affirmative reply for a given data structure prompts computing device 101 to open and search the corresponding container file for the requested stream by its stream ID. If found in that container, the full stream can be read out from the container provided to whichever component of application 103 prompted the access request. If the stream is not found in that container, then computing device 101 proceeds to the next container file until the stream is found. Application 103 may then play-out the event described in the stream such as by displaying an edit made by another user in the shared document, removing or hiding changes made by other users, or the like.

Figure 3:
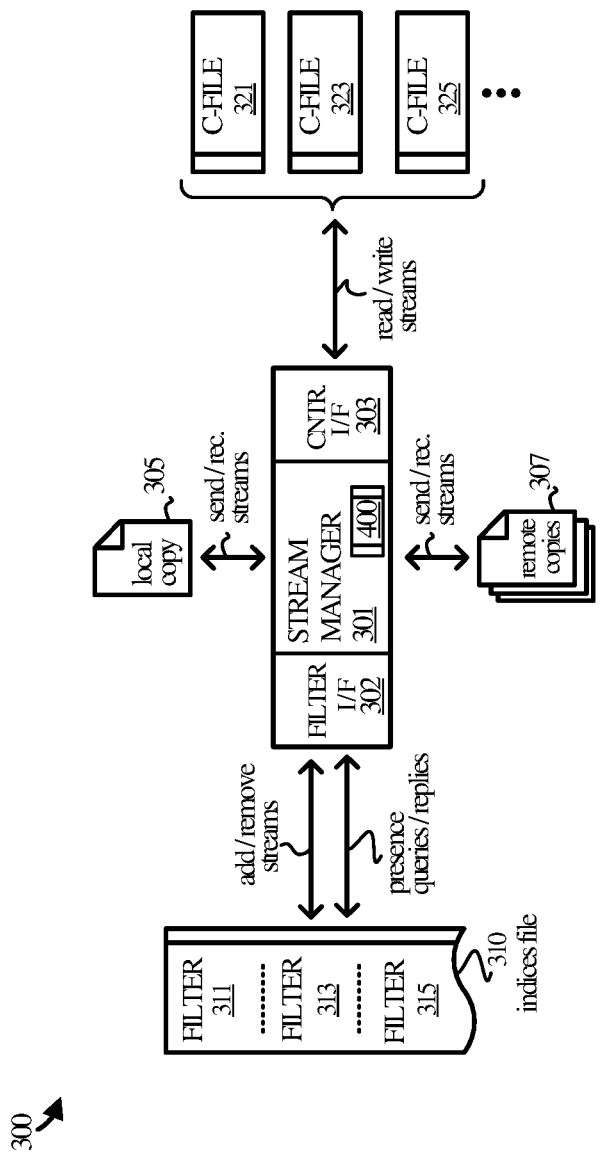
FIG. 3 illustrates a stream management architecture in an implementation.

FIG. 3 illustrates a stream management architecture 300 in an implementation. Stream management architecture 300 is representative of an arrangement of software components and data structures employed locally to support co-authoring. Stream management architecture 300 may be employed in the context of a software application on a computing device, for example, of which computing device 1001 in FIG. 10 is broadly representative.

Stream management architecture 300 includes stream manager 301, filter interface 302, and container interface 303. Stream manager 301 manages the reading and writing of streams to and from container files 321, 323, and 325 via container interface 303. Stream manager 301 also manages the indexing of the streams into filters 311, 313, and 315 within indices file 310 via filter interface 302.

Stream manager 301 sends and receive co-authoring streams to and from one or more other elements of the application within which it operates. The streams relate to co-authoring events originating in a local copy 305 of a shared document and also to co-authoring events originating in one or more remote copies 307 of the shared document. The other elements of the application may be responsible for sending a new stream to one or more other participants engaged in co-authoring the document, displaying the co-authoring events to which a given stream pertains, or otherwise manipulating or modifying the local document with respect to the editing events identified in the streams.

For example, a user of the computing device within which stream manager 301 is employed may edit the local document, causing streams to be created and persisted to container files 321, 323, and 325. The streams are indexed in indices file 310 to provide fast access and retrieval for when the streams are requested. The steams are also communicated to the devices and applications employed by the other co-author(s) engaged in the co-authoring sessions. The streams are persisted and indexed in their own local environments to enable their fast access and retrieval at later times.

Figure 4:
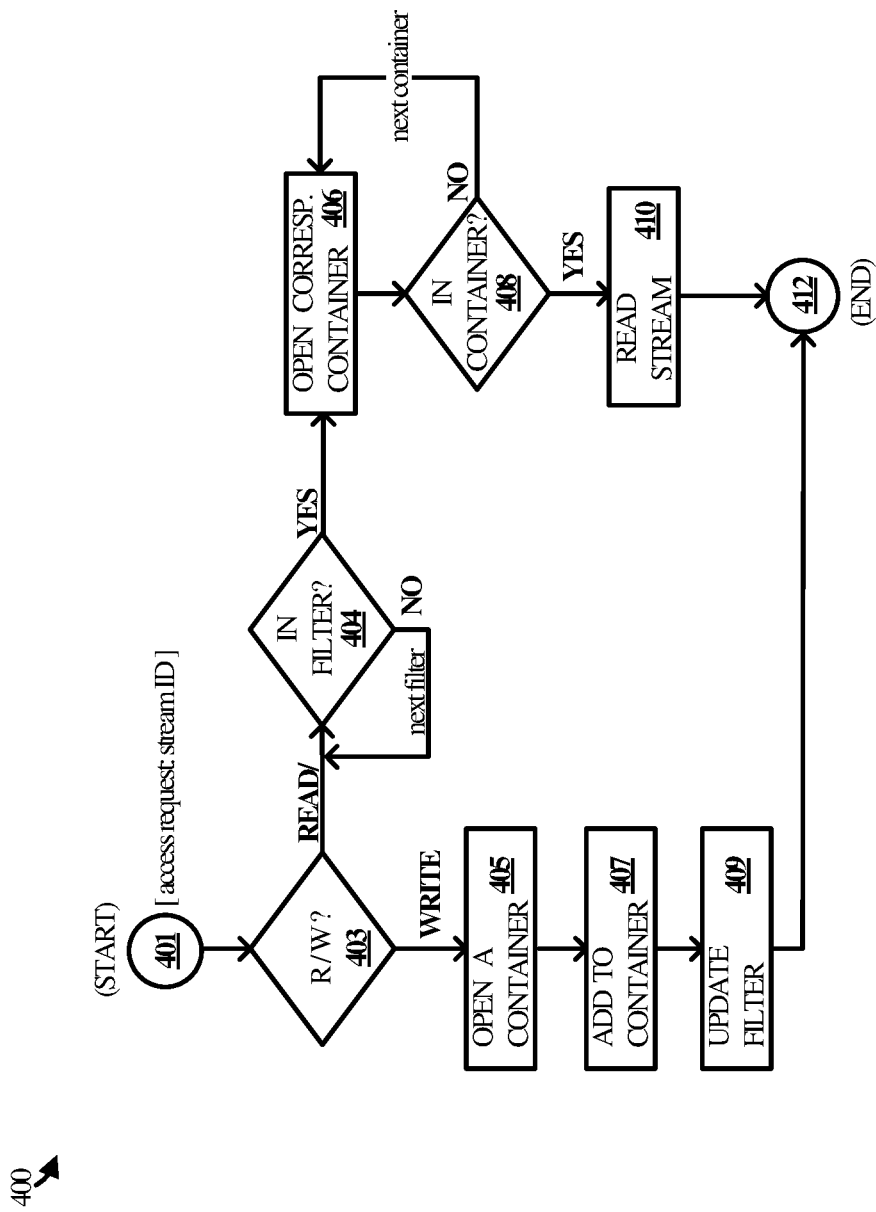
FIG. 4 illustrates another stream management process in an implementation.

FIG. 4 illustrates a stream management process 400 employed by storage manager 301 to manage the storage, indexing, and retrieval of streams in co-authoring implementations. Stream management process 400 may be implemented in program instructions in the context of any of the software applications, modules, components, or other such programming elements of a computing device. The program instructions direct the computing device to operate as follows, referring parenthetically to the steps in FIG. 4 in the context of stream management architecture 300 for exemplary purposes.

Stream management process 400 begins with an access request that is made by an application component to read or write a stream (step 401). The computing device executing stream management process 400 determines whether the access request pertains to a read operation or a write (add) operation. The access request may explicitly state or otherwise indicate whether it is a read request or a write request, although such an indication is not required.

If the access request is for purposes of writing a stream, the computing device identifies the container file and opens it in memory if it is not already open (step 405). The determination of which container file to use may be based on a variety of factors including how full the most recent container file may be. Other heuristics may be employed when selecting the container file. In addition, opening the container file may include the step of creating a new container file if all the existing container files are full and cannot not accept any additional streams. The computing device adds the stream to the container file (step 407) by writing the contents of the stream to the file, including the stream ID. The stream ID can be referenced in subsequent look-ups during a read operation.

The computing device then updates the filter corresponding to the container file (step 409). Updating the filter includes, for example, entering the stream into one or more probabilistic indices of the filter to allow for fast presence determinations with respect to subsequent read operations.

Returning to step 403, if the access pertains to a read operation, the computing device proceeds to iteratively check for the presence of the stream in the filters (step 404). If a filter does not indicate that the stream is present, then the computing device proceeds to the next filter, and so on until all the filters have been checked, in which case an error or other such reply would be provided to the requesting component.

Assuming that one of the filters replies in the affirmative, the computing device proceeds to identify and open the container file that corresponds to the filter (step 406). The computing device searches the contents of the container file for the requested stream by the stream ID or other suitable key (step 408). If the stream is not found in the container, the computing device proceeds iteratively through the remaining container files to find the container file that does have the stream. The order in which the container files are searched may be sequential, pseudo random, or determined on some other heuristic basis such as from the newest to oldest container.

Having found and opened the container file that holds the requested stream, the computing device reads-out the stream from the container file and supplies the stream to the requesting component (step 410). The process then ends at step 412.

In some implementations, it is possible to delete streams from the container files by removing them from the filters. For example, Cuckoo filters allow items to be removed from an index, whereas Bloom filters do not. To delete a stream, an application component would submit a delete request to the stream manager which would then proceed to identify the filter that holds an indication of the stream. The stream manager would check the filters on an iterative basis until the correct filter is found. One or more indices of the filter may then be adjusted to remove an indication of the stream.

Over time, removing streams from a filter can lead to a situation where a substantial portion of the streams remaining in the corresponding container file are dead in that there is no indication in the filter that the streams exist. When the dead streams in a container file exceed a certain percentage of the entire file, a new container file may be created, and the live streams moved to the new container file. The filter will now correspond to the new container file, although in some scenarios a new filter may be generated entirely.

Figure 5:
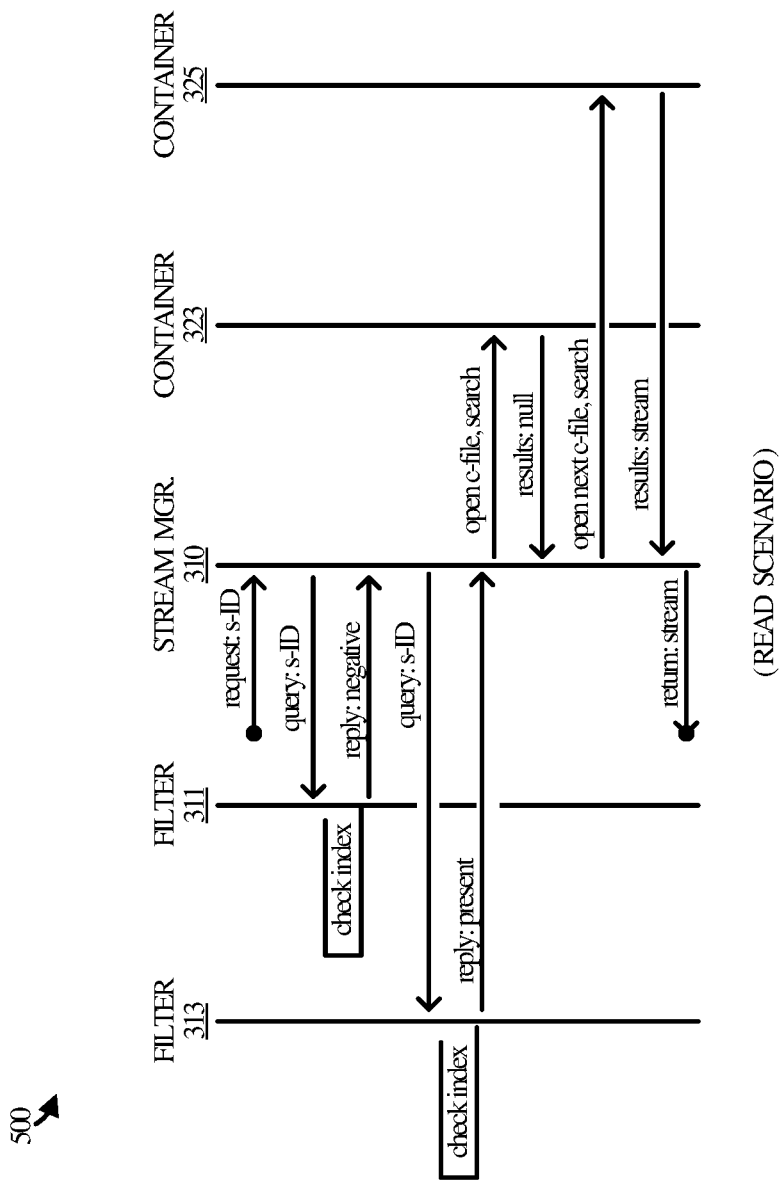
FIG. 5 illustrates an operational sequence in an implementation.

FIG. 5 illustrates an operational sequence 500 pertaining to a read operation with respect to stream management architecture 300. In operation, stream manger 310 receives a read request that identifies a stream by its stream ID. Stream manager 310 proceeds to query filters 311, 313, and 323 iteratively to find the filter that holds an indication of the requested stream. Here, filter 323 responds in the affirmative that it holds an indication of the requested stream. As a result, stream manager 310 need not query any remaining filters.

Next, stream manager 310 opens container file 323 since it corresponds to filter 313 and searches its contents for the stream ID. In this example, the search fails as container file 323 does not hold the requested stream. Stream manager 310 proceeds to open and search the next container file (container file 325) and this time, the search is a success. Stream manager 310 reads out the stream and supplies its contents to the requesting component.

Figure 6:
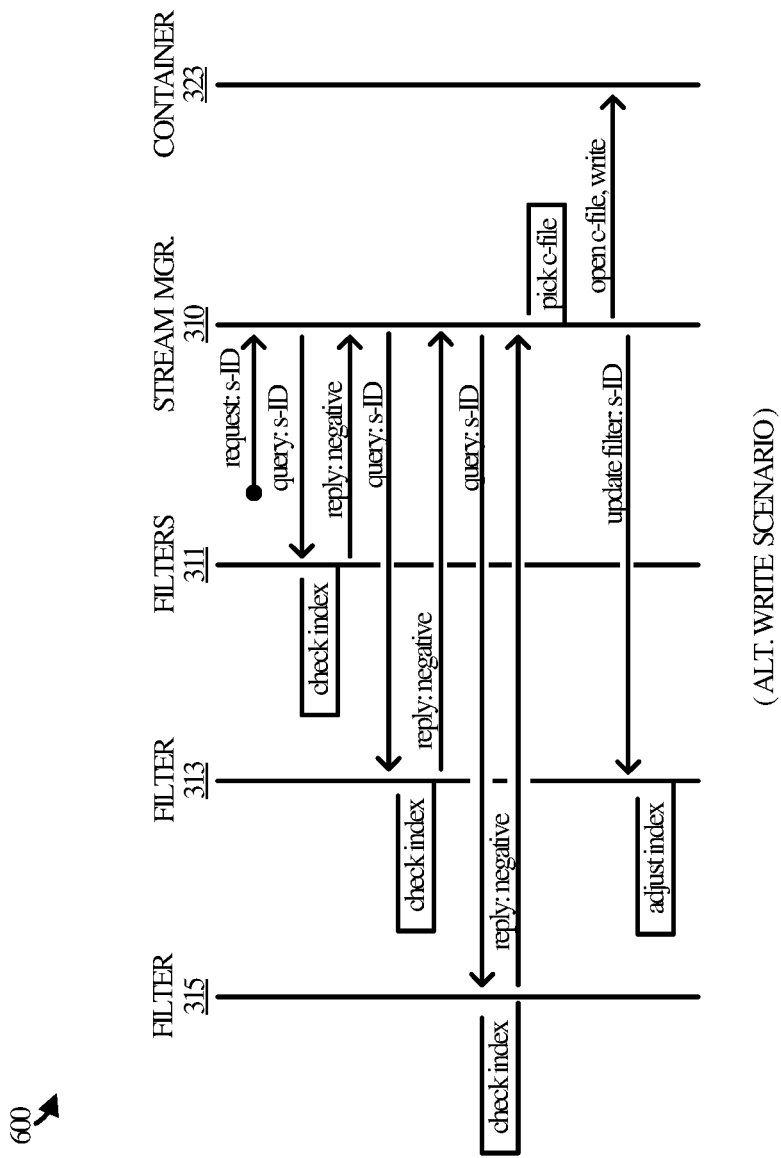
FIG. 6 illustrates another operational sequence in an implementation.

FIG. 6 illustrates an operational sequence 600 with respect to stream management architecture 300 to illustrate alternative aspects of stream management process 400. In particular, operational sequence 600 pertains to an alternative write scenario where a write request is received at stream manager 310. Stream manager 310 proceeds to query filters 311, 313, and 323 iteratively to find the filter that holds an indication of the requested stream. Stream manager 310 queries the filters via filter interface 302 using the stream ID of the requested stream.

In this example, none of the filters acknowledge the presence of the stream, meaning that the stream has not yet been written to any of the container files. Stream manager 310 responsively proceeds to identify a container file to which to add the stream and updates its corresponding filter. Here, container file 325 is selected and as such, filter 313 is adjusted to reflect the presence of the stream in container file 325.

Figure 7:
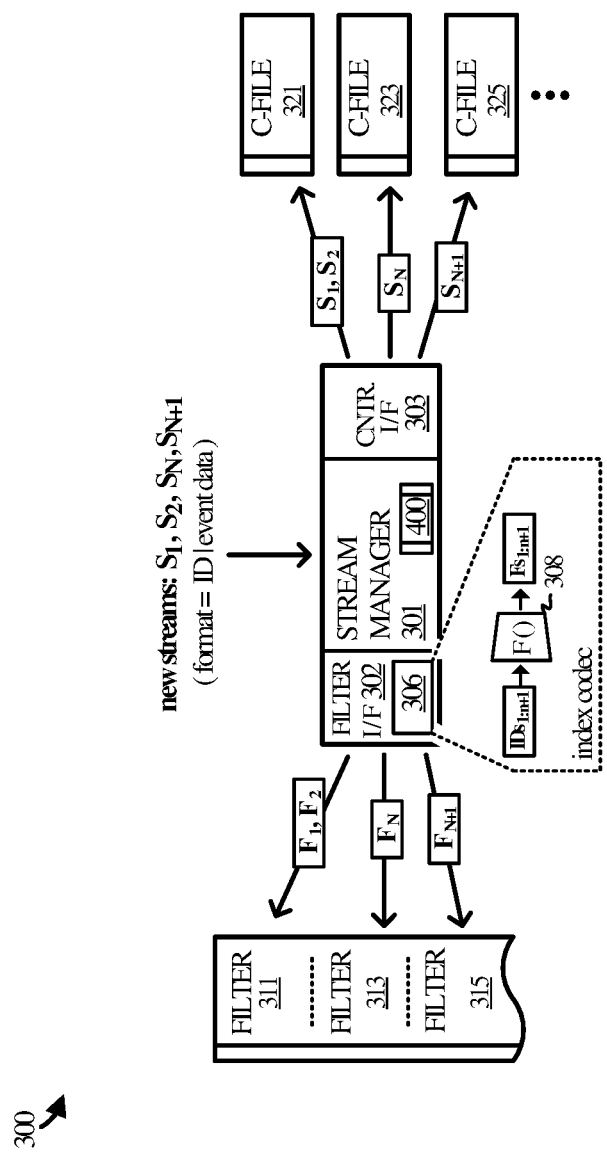
FIG. 7 illustrates and operational scenario in an implementation.

FIG. 7 illustrates a write scenario with respect to stream management architecture 300 in an implementation. In operation, stream manager 301 receives several new streams to persist represented by $S_1$, $S_2$, $S_N$, and $S_{N+1}$. The streams have a basic format that includes at least a stream ID and even data associated with the co-authoring event that triggered the stream. Stream manager 301 determines to write $S_1$ and $S_2$ to container file 321, while writing $S_N$ and $S_{N+1}$ to container file 323 and container file 325 respectively. Next, the corresponding filters need to be updated.

To update the filters, stream manager 301 provides the stream IDs and corresponding locations to filter interface 302. For each stream ID, filter interface 302 employs a filter process 306 to adjust the index or indices of the relevant filter to reflect the presence of the identified stream in the corresponding container file.

In a highly simplified example, filter process 306 encodes the stream ID into a filter value $F_X$ with which the filter's index or indices are updated. Filter process 306 may include one or more hash functions 308 that produce the filter value. The specifics of filter process 306 depend upon the specific type of filter being implemented whether it is a Cuckoo filter, a Bloom filter, or the like. Here, filter 311 is adjusted based on filter values $F_1$ and $F_2$, while filter 313 and filter 315 are adjusted based on $F_N$ and $F_{N+1}$ respectively.

Figure 8:
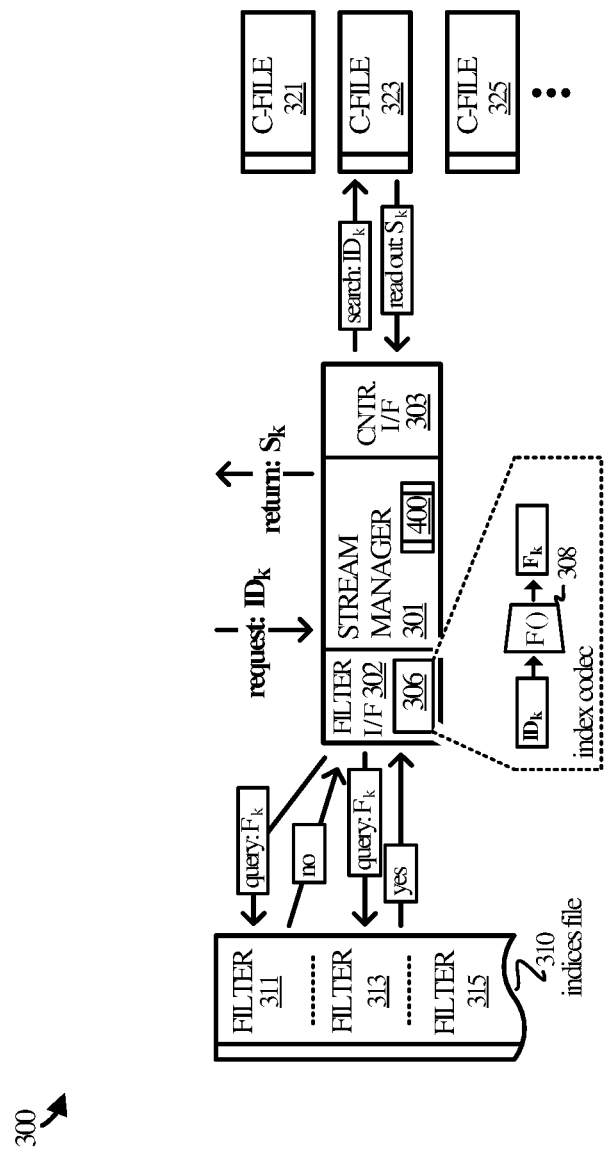
FIG. 8 illustrates another operational scenario in an implementation.

In FIG. 8, a read scenario is depicted with respect to stream management architecture 300. In operation, stream manager 301 receives a read request that identifies a stream by its ID. Stream manager 301 passes the request to filter interface 302 which proceeds to identify a corresponding filter value. Filter interface 302 determines the filter value by inputting the stream ID to the same filter process 306 that determines the filter values with respect to write requests. Here, $ID_K$ is translated to $F_K$, which is used to iteratively query filters 311, 313, and 315 for the presence of the stream.

For example, filter interface 302 queries filter 311, but receives a negative reply indicating that the stream has not been indexed in filter 311. Filter interface 302 proceeds next to filter 313 which responds in the affirmative. Stream manager 301 then proceeds to first search container file 323 via container interface 303, since container file 323 corresponds to filter 313. The search is performed using the stream identifier $ID_K$ which quickly results in the readout of the entire stream from container file 323. Stream manager 301 can then return the stream $S_K$ to the requesting component.

Figure 9:
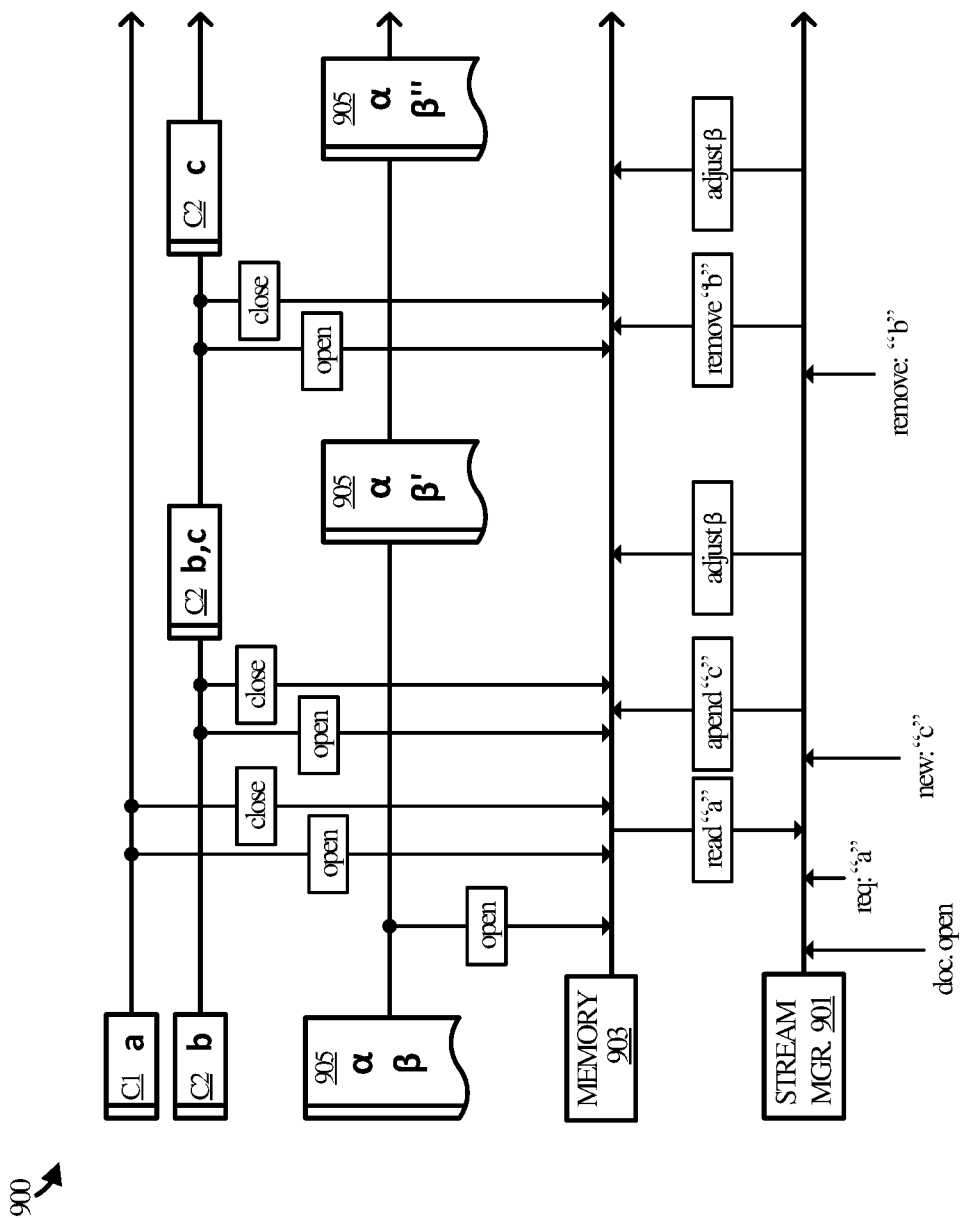
FIG. 9 illustrates a timing diagram in an implementation.

FIG. 9 illustrates a timing diagram 900 in an implementation the enhanced stream management concepts proposed herein. Timing diagram 900 relates to an operational environment that includes a stream manager 901, memory 903, an indices file 905, and two container files C1 and C2, all of which may be implemented on a suitable computing device. Stream manager 901 represents one or more components of a productivity application used to edit documents and having co-authoring capabilities. Memory 903 represents system memory of the computing device such as random-access memory.

Indices file 905 represents a file belonging to a local document that is opened in memory 903. The local document is associated with a co-authoring session and thus is one copy of the document that is the subject of the session. Other instances of the document may be open on the computers of other participants in the session. Indices file 905 holds filters α and β that correspond to container files C1 and C2. Container files C1 and C2 also belong to the local document and store the streams generated by co-authoring activities.

In operation, indices file 905 is loaded in its entirety into memory 903 when the document is opened. Next, a request for stream "a" is received into stream manager 901. Stream manager 901 queries the filter α in indices file 905 to determine that stream "a" is located in container file C1. Container file C1 is therefore opened and "a" is read out from the file. The container file may then be closed.

Next, an add request for stream "c" is received into stream manger 901. Stream manger 901 determines that container file C2, which already holds stream "b," can take stream "c". Container file C2 is opened in memory 903 and stream "c" is added to it. Stream manager 901 next proceeds to update filter β in indices file 905 as it corresponds to container file C2. Accordingly, β becomes β'.

A removal request is then received into stream manager 901 to remove stream "b." Stream manger 901 queries filter α and then β to find the location of stream "b." Stream "b" is then removed from filter β so that it can no longer be resolved to container file C2. The actual contents of stream "b" may remain in container file C2, but subsequent read requests will indicate that stream "b" does not exist.

FIG. 10 illustrates computing device 1001 that is representative of any system or collection of systems in which the various processes, programs, services, and scenarios disclosed herein may be implemented. Examples of computing device 1001 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 1001 may be implemented as a single apparatus, system, or device or may be implemented in a distributed manner as multiple apparatuses, systems, or devices. Computing device 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements stream management process 1006, which is representative of the stream management processes discussed with respect to the preceding Figures. When executed by processing system 1002, software 1005 directs processing system 1002 to operate as described herein for at least the various processes, operational scenarios, and sequences discussed in the foregoing implementations. Computing device 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including stream management process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing a stream management process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing device 1001 is representative) overall from a general-purpose computing system into a special-purpose computing system customized to perform stream management in an optimized manner. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
in a computing device:
receiving streams related to authoring events occurring in instances of an electronic document remote from a local instance of the electronic document open on the computing device, wherein the local instance of the electronic document comprises multiple container files in which to store the streams;
storing the streams in the multiple container files of the local instance of the electronic document;
maintaining an indices file to reflect a presence of the streams in the container files, wherein the indices file comprises multiple probabilistic data structures corresponding to the container files that each indicate on a probabilistic basis whether a given stream is present in a corresponding one of the container files;
using the indices file to retrieve requested ones of the streams from the container files; and
displaying ones of the authoring events corresponding to the requested ones of the streams in a context of the local instance of the document.

2. The method of claim 1 further comprising receiving a request for a stream, wherein using the indices file to retrieve the requested ones of the streams comprises iteratively querying the probabilistic data structures to obtain an indication of whether the stream is present in a corresponding one of the container files.

3. The method of claim 2 further comprising keeping an entirety of the indices file resident in random access memory (RAM) of the computing device when the instance of the electronic document is open on the computing device.

4. The method of claim 1 wherein maintaining the indices file comprises adding one of the streams to one of the probabilistic data structures when the one of the streams is added to a corresponding one of the container files.

5. The method of claim 4 wherein maintaining the indices file comprises removing the one of the streams from the one of the probabilistic data structures in order to delete the one of the streams from the corresponding one of the container files.

6. The method of claim 1 wherein the probabilistic data structures correspond to the container files on a one-to-one basis.

7. The method of claim 6 wherein the probabilistic data structures comprise probabilistic filters.

8. A computing device comprising:
one or more processors;
one or more computer readable storage media operatively coupled with the one or more processors; and
program instructions stored on the one or more computer readable storage media that, when executed by the one or more processors, direct the computing device to at least:
receive streams related to co-authoring events occurring in instances of an electronic document remote from a local instance of the electronic document open on the computing device, wherein the local instance of the electronic document comprises multiple container files in which to store the streams;
store the streams in the multiple container files of the local instance of the electronic document;
maintain an indices file to reflect a presence of the streams in the container files, wherein the indices file comprises multiple probabilistic data structures corresponding to the container files that each indicate on a probabilistic basis whether a given stream is present in a corresponding one of the container files;
retrieve requested ones of the streams from the container files using the indices file; and
display ones of the authoring events corresponding to the requested ones of the streams in a context of the local instance of the document.

9. The computing device of claim 8 wherein the program instructions further direct the computing device to receive a request for a stream, and wherein to retrieve the requested ones of the streams from the container files using the indices file, the program instructions direct the computing device to iteratively query the probabilistic data structures to obtain an indication of whether the stream is present in a corresponding one of the container files.

10. The computing device of claim 9 wherein the program instructions further direct the computing device to keep an entirety of the indices file resident in random access memory (RAM) of the computing device when the instance of the electronic document is open on the computing device.

11. The computing device of claim 8 wherein to maintain the indices file, the program instructions direct the computing device to add one of the streams to one of the probabilistic data structures when the one of the streams is added to a corresponding one of the container files.

12. The computing device of claim 8 wherein to maintain the indices file, the program instructions direct the computing device to remove the one of the streams from the one of the probabilistic data structures in order to delete the one of the streams from the corresponding one of the container files.

13. The computing device of claim 12 wherein the probabilistic data structures correspond to the container files on a one-to-one basis.

14. The computing device of claim 13 wherein the probabilistic data structures comprise probabilistic filters.

15. One or more computer readable storage media having program instructions stored thereon that, when executed by one or more processors, direct a computing device to at least:
receive streams related to co-authoring events occurring in instances of an electronic document remote from a local instance of the electronic document open on the computing device, wherein the local instance of the electronic document comprises multiple container files in which to store the streams;
store the streams in the multiple container files of the local instance of the electronic document;
maintain an indices file to reflect a presence of the streams in the container files, wherein the indices file comprises multiple probabilistic data structures corresponding to the container files that each indicate on a probabilistic basis whether a given stream is present in a corresponding one of the container files;
retrieve requested ones of the streams from the container files using the indices file; and
display ones of the authoring events corresponding to the requested ones of the streams in a context of the local instance of the document.

16. The one or more computer readable storage media of claim 15 wherein the program instructions further direct the computing device to receive a request for a stream, and wherein to retrieve the requested ones of the streams from the container files using the indices file, the program instructions direct the computing device to iteratively query the probabilistic data structures to obtain an indication of whether the stream is present in a corresponding one of the container files.

17. The one or more computer readable storage media of claim 16 wherein the program instructions further direct the computing device to keep an entirety of the indices file resident in random access memory (RAM) of the computing device when the instance of the electronic document is open on the computing device.

18. The one or more computer readable storage media of claim 15 wherein to maintain the indices file, the program instructions direct the computing device to add one of the streams to one of the probabilistic data structures when the one of the streams is added to a corresponding one of the container files.

19. The one or more computer readable storage media of claim 18 wherein to maintain the indices file, the program instructions direct the computing device to remove the one of the streams from the one of the probabilistic data structures in order to delete the one of the streams from the corresponding one of the container files.

20. The one or more computer readable storage media of claim 19 wherein the probabilistic data structures correspond to the container files on a one-to-one basis and wherein the probabilistic data structures comprise probabilistic filters.

* * * * *